March 18, 1930.  C. H. PEEL  1,751,054
LAWN MOWER
Filed Oct. 25, 1928
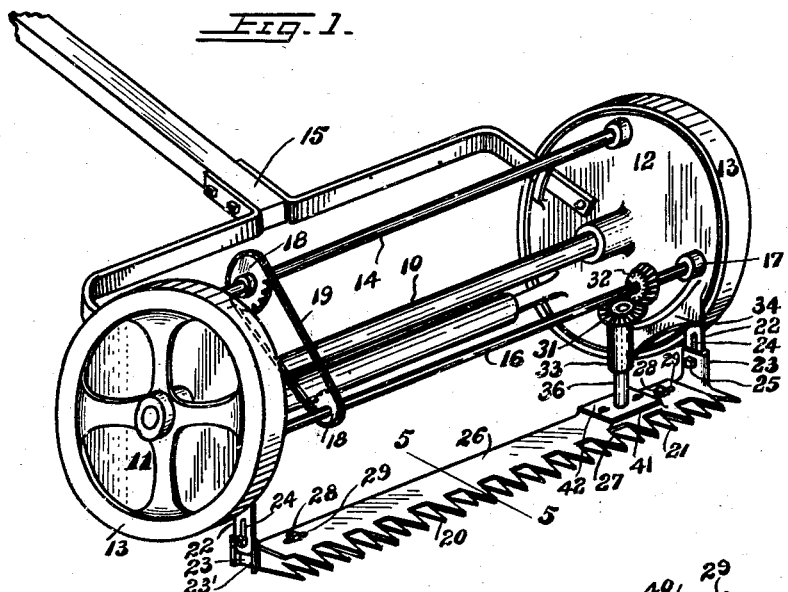
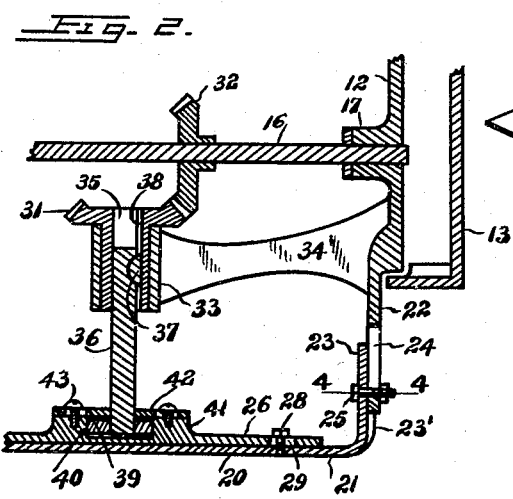
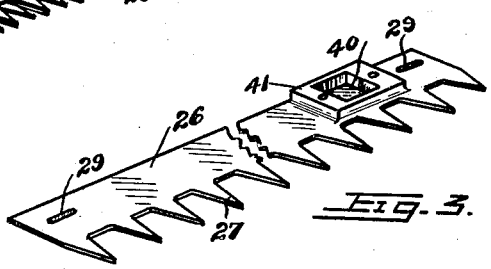
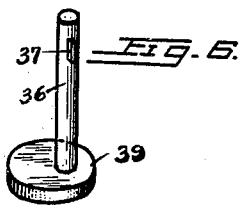
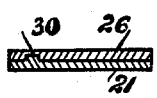
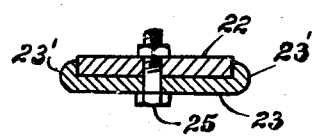
Inventor
Clarence Howarth Peel
By Frederick C. Bromley
Attorney.

Patented Mar. 18, 1930

1,751,054

UNITED STATES PATENT OFFICE

CLARENCE HOWARTH PEEL, OF DUNDAS, ONTARIO, CANADA

LAWN MOWER

Application filed October 25, 1928. Serial No. 314,971.

The invention relates to improvements in lawn mowers as described in the present specification and shown in the accompanying drawings which form part of the same.

The invention has for its general object to provide an efficient and serviceable lawn mower that requires but little power to operate. More specifically the invention takes the form of a lawn mower in which the cutting mechanism has a scissorlike action in contradistinction to the rotary spiral blades of the ordinary lawn mower. This mower presents many salient advantages in that with it a lawn may be cut right up to the edge of an obstruction thus obviating a great deal of work hand trimming: moreover the cutting mechanism is adjustable for shearing the grass over a large range of heights and is particularly suitable for cutting close to the ground. With this and other objects in view the invention consists of the novel construction and arrangement of parts as described in detail in the specification and claimed in the claim thereafter following.

Referring to the drawings: Figure 1 is a perspective view of the lawn mower embodying the present invention.

Figure 2 is a vertical section through the cutting blades and mechanism therefor.

Figure 3 is a perspective view of the knife or oscillating blade.

Figure 4 is a cross section through one of the supporting brackets for the cutters. This section is taken on the line 4—4 of Figure 2.

Figure 5 is a transverse section taken on the line 5—5 of Figure 1 illustrating a key for guiding the movable blade on the stationary blade.

Figure 6 is a perspective view of an eccentric and shaft for oscillating the knife or movable blade.

Like numerals of reference indicate corresponding parts in each of the figures throughout the drawings.

In the drawings: the lawn mower to which this invention is applied may have the usual frame which comprises the dead axle 10 to which is rigidly affixed the end plates 11 and 12 on which the various operating mechanism is mounted. The wheels 13 are mounted upon the axle 10 on the outside of the respective end plates 11 and 12 as customary. The power is taken off these wheels in the form of the usual traction drive consisting of the shaft 14 that extends from one to the other of the plates 11 and 12 and carries pinions that mesh with teeth provided on the internal surfaces of the wheels 13. These pinions are preferably of the ratchet type design in order to transmit power to the shaft 14 as the lawn mower is being forwardly propelled only. This is of conventional construction and the pinions together with the internal teeth of the wheels are not illustrated since they do not form a part of the present invention.

15 is the customary handle which extends rearwardly of the end plates 11 and 12 and is connected thereto as usual.

16 is a shaft extending transversely and is positioned in advance of the axle 10. The ends of this shaft are journalled in bearings as at 17 integral with or secured to the end plates 11 and 12. This shaft is geared to the shaft 14 by a pair of sprockets 18 over which a chain 19 is mounted. The driving sprocket of the pair is preferably made much larger in order to transmit power to the driving shaft 16 at a much greater speed. It is to be understood that gearing other than the sprockets and chain may be employed in this capacity if so desired and the invention is not to be limited in this respect.

20 is the cutting mechanism which comprises a stationary blade 21 positioned below the shaft 16 and forwardly of the wheels 13. This cutter is adjustably supported from the end plates 11 and 12 in order that it may be raised or lowered with respect to the ground. The preferable mode of connecting the blade takes the form of brackets 22 depending from the respective end plates 11 and 12, such brackets being formed integral therewith or secured thereto in any desirable manner.

Rising from the opposing ends of the blade 21 are lugs 23 preferably integral therewith, which lugs overlap the respective termini of the brackets 22 and are provided with flanges 23' best discernible in Figure 4 in order to act as guides and to take the cutting thrust.

These flanges extend vertically along the edges of the brackets.

Each bracket is provided with a longitudinal slot as at 24 through which a bolt 25 is passed and enters a perforation in the respective lug 23 and has a nut affixed on its shank in order that upon tightening it may bind the bracket and lug together. By this construction it will be readily seen that the stationary plate 21 may be adjusted vertically by merely slackening the nuts on the bolts 25 and resetting the cutter in any desired position and thereupon retightening the nuts.

26 is a knife or movable blade which surmounts the fixed blade 21 and is provided with teeth 27 for crossing the teeth thereof during oscillation. This knife is retained in place by screws 28 which loosely pass through slots 29 and threadedly engage the fixed blade 21. In order to guide the knife in its longitudinal reciprocation it is preferable to provide an upstanding key 30 upon the fixed blade 21 so as to enter a keyway in the knife; see Figure 5. This key may extend continuously between the blades, or in place thereof a number of short keys may be used.

Power is taken off the shaft 16 in order to operate the knife and so as to convert the rotary movement of the shaft into a reciprocation of the blade. Mechanism is provided comprising a pair of meshing bevel gears 31, 32, the latter of which is keyed to the shaft 16 while the former is journalled in a bearing 33 that is borne by the end plate by a bracket 34.

The hub of the gear 31 extends vertically and is bored as at 35 to slidably receive a shaft 36 providing a telescopic action, independent rotation of the parts being precluded by a key 37 that slides in a keyway 38.

The lower end of the shaft is rigidly affixed, or integral with, an eccentric 39 that operates in a well 40 of a boss 41 which is provided on the top face of the knife 26. The eccentric engages opposing faces of the well in order to reciprocate the knife, a cover 42 being provided to protect the eccentric from dust and foreign elements.

It will be readily understood by those skilled in the art that the cover will necessarily have to have a certain amount of play with respect to the boss 41 in order to take care of the movement of the knife and to this end it is preferable to attach the cover to the boss by means of screws 43 that are fitted in slots provided in the cover; this, however, can be accomplished in any other convenient way if so desired.

In the operation of the invention when the lawn mower is traversed over the ground by means of the handle 15 power is delivered by the shaft 14 from the sprocket and chain connection to the shaft 16 which in turn operates the vertical shaft 36 through the medium of the bevel gears 31 and 32. As this shaft rotates its eccentric 39 rapidly oscillates the knife or movable blade 26 thus producing the cutting action.

Whereas this invention has been shown and described in connection with a hand propelled lawn mower it will be nevertheless apparent to those skilled in the art that it is equally applicable to a power driven lawn mower.

What I claim is:—

In a lawn mower, a fixed horizontal cutter blade transversely disposed and having teeth projecting from its forward edge, a knife mounted thereon for reciprocal movement, means for adjustably securing the fixed blade in the frame, a boss borne by the knife providing a well, an eccentric operably retained therein, a shaft rigidly rising from said eccentric, a bearing projecting from the frame, a gear journalled therein, said gear having an elongated bore telescopically receiving said shaft, a key precluding independent rotation therebetween, and a driven gear meshing with said gear.

Signed at Hamilton, Canada, this 18th day of October, 1928.

CLARENCE HOWARTH PEEL.